No. 631,307. Patented Aug. 22, 1899.
C. C. INSKEEP & J. E. CHAMBERS.
OPHTHALMOMETER.
(Application filed Apr. 7, 1899.)
(No Model.) 2 Sheets—Sheet 1.
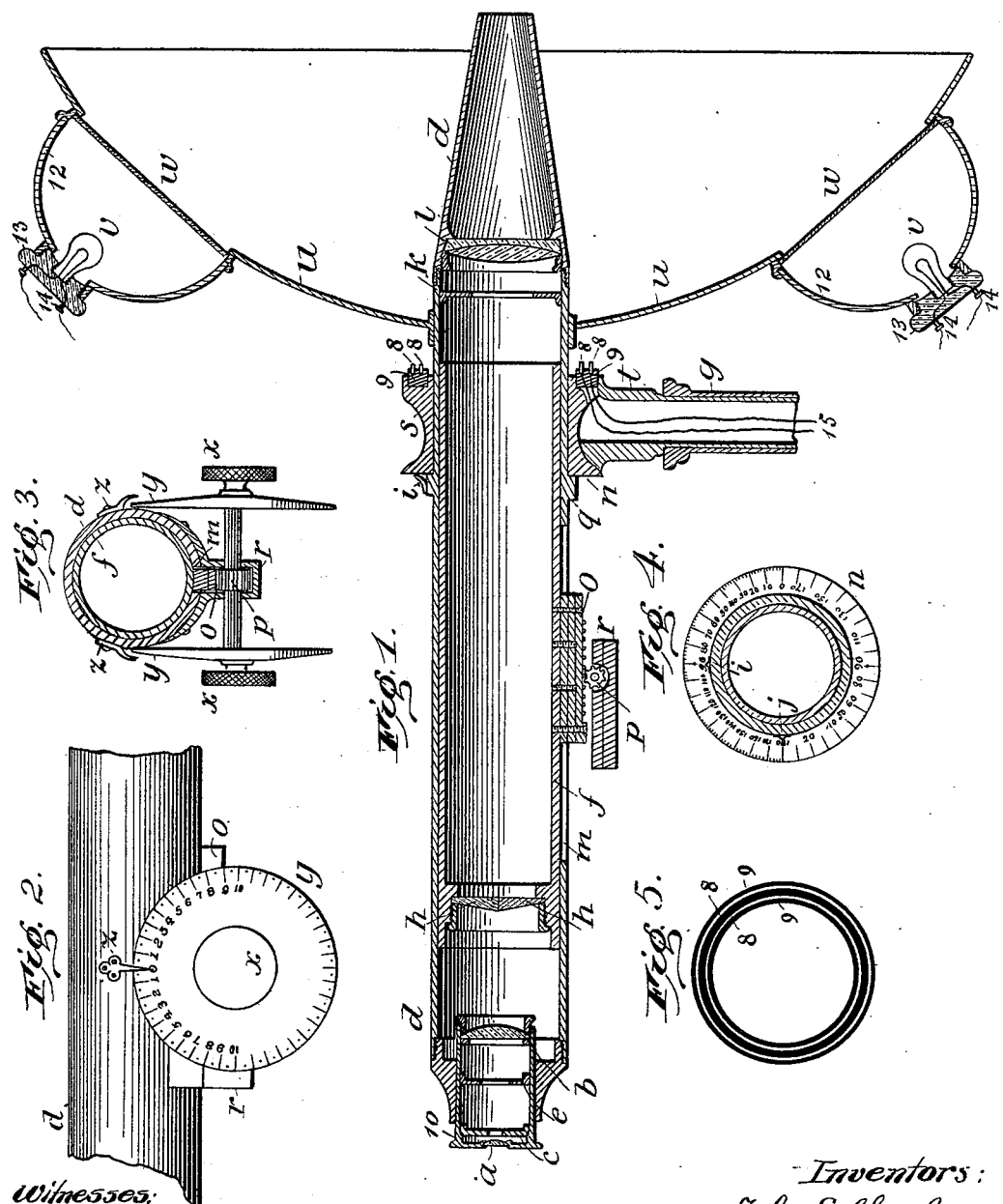
Witnesses:
J. M. Fowler Jr.
Bernard M. Offutt
Inventors:
John E. Chambers,
Charles C. Inskeep,
by Henry H. Bates,
Attorney.

No. 631,307. Patented Aug. 22, 1899.
C. C. INSKEEP & J. E. CHAMBERS.
OPHTHALMOMETER.
(Application filed Apr. 7, 1899.)
(No Model.) 2 Sheets—Sheet 2.
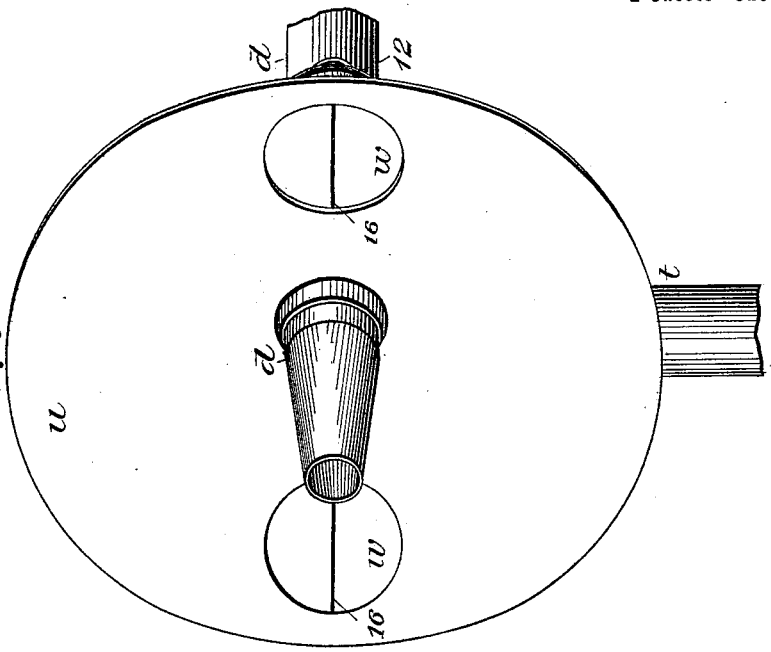
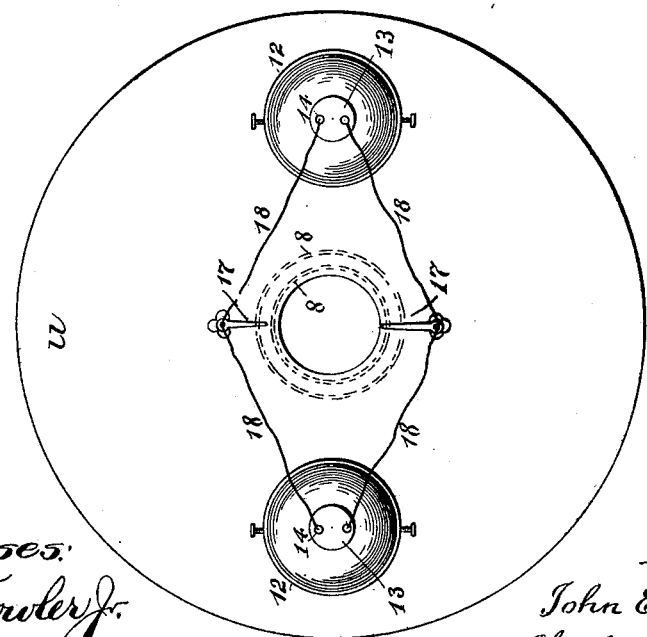
Witnesses:
J. M. Fowler Jr.
Bernard M. Offutt
Inventors:
John E. Chambers,
Charles C. Inskeep,
by Henry H. Bates,
Attorney.

UNITED STATES PATENT OFFICE.

CHARLES CHAMBERS INSKEEP AND JOHN EDGERLY CHAMBERS, OF CHICAGO, ILLINOIS.

OPHTHALMOMETER.

SPECIFICATION forming part of Letters Patent No. 631,307, dated August 22, 1899.

Application filed April 7, 1899. Serial No. 712,087. (No model.)

*To all whom it may concern:*

Be it known that we, CHARLES CHAMBERS INSKEEP and JOHN EDGERLY CHAMBERS, citizens of the United States, residing at Chicago, in the county of Cook and State of Illinois, have invented certain new an useful Improvements in Ophthalmometers; and we do hereby declare the following to be a full, clear, and exact description of the invention, such as will enable others skilled in the art to which it appertains to make and use the same.

Our invention relates to ophthalmometers or instruments for measuring the differences in the curvature of the cornea for the correction of corneal astigmatism, which, as is well known, results from said differences of curvature, whereby the rays of light transmitted through the cornea are refracted to different foci, rendering a clear image of the object of vision impossible. The general principle on which the measurement of the said differences of curvature is based is the observation of images of illuminated objects reflected from the corneal surface in different meridians viewed through a telescope, with means for quantitatively determining the relative departure of such images from their normal position with reference to a given meridian. The illuminated objects are known in the art as "mires," and the unit of the differential scale of refractive power is the "diopter."

Our improvements consist in certain new and useful modifications in instruments of this class whereby we are enabled to use mires which are constantly fixed relatively to the rotating disk which supports them instead of movable thereon, as heretofore, in the employment of mires which are self-luminous or illuminated by transmitted instead of by reflected light, in the employment of mires of compact area instead of mires broken up into steps for promoting the approximate estimation of refractive differences in diopters, in the use of a double prism in the optical axis made movable and adjustable therein whereby the optical images of the mires in the plane of the mires can be approximated or separated by said movement and adjustment, by the employment of a rotary scale graduated in any convenient unit of measurement—as, for example, in diopters and fractions thereof for indicating accurately the relative approximations and separations of said optical images dependent on the relative position of said prism—and by other minor details of construction hereinafter specified.

In the drawings forming a part of this specification, Figure 1 is a vertical section of that portion of the instrument necessary to exhibit the improvements above referred to. Fig. 2 is a side elevation of a portion of the optical tube of the telescope, showing the arrangement of the rotary dioptric scale attached thereto and its fixed index. Fig. 3 is a front elevation of the parts shown in Fig. 2, with the tubes in section. Fig. 4 is a face view of the graduated circular scale *n*, with tubes in section. Fig. 5 is a view of the insulation-rings through which current is sent to the lights borne on the rotary disk. Fig. 6 is a view showing the inner face of the blackened disk and the luminous mires. Fig. 7 is an elevation showing the rear of the disk, with arrangement of the illuminating features and electrical contacts.

*d* represents the outer tube of the telescope for observing the cornea of the eye to be measured. This tube is mounted so as to rotate in a sleeve or collar *s*, supported by a standard *t* in the usual manner, said standard being swiveled in a tubular support *g* and preferably furnished with the usual appliances (not herein shown) for vertical and rotary adjustment and clamping means for securing said adjustments, all mounted movably on a suitable base or stand, with ordinary appliances for traversing the instrument back and forth on said base or stand.

*l* is the achromatic objective lens of the telescope.

*k* is a diaphragm.

10 is the eyepiece, provided with suitable lenses *a b*, (said eyepiece may be either fixed or movable,) diaphragm *c* for centering vision, and diaphragm *e*.

*n* represents a stationary disk borne on collar *s*, graduated in degrees to indicate angles of meridional deviation of the plane of the mires. Said degrees read preferably from "0" to "180°" from right to left in the upper half of the scale and from "0" to "180°" from left to right in the lower half of the scale, as shown in Fig. 4.

*i* is a pointer or index carried on annular ridge *q* of the telescope-tube to point out the angle on the graduated scale which the plane of the mires forms with the prime meridian. This pointer is therefore located in the plane of the centers of the mires, and there is preferably a second pointer *j*, also borne on ridge *q* and located at ninety degrees from pointer *i*, as shown in Fig. 4, so that when pointer *i* points to "90°" pointer *j* points to "180°."

*u* is the concave disk supporting the mires, blackened on its inner face and carried on the outer telescope-tube *d* and rotating with it.

*w w* are the mires. These mires are preferably of disk form, as shown in Fig. 6, and are located on the concave disk *u* in fixed positions with their centers at equal distances on each side of the axis of the telescope, which is in the center of said disk. They should be diametrally located at such distances from said optical axis that the images thereof will be reflected from the corneal surface directly through the telescopic tube in parallel lines when the said corneal surface is exactly in the focus of the combination of lenses forming the telescope. Said mires are centrally crossed by straight black lines 16 16, which if prolonged pass through the optical axis of the telescope, and these lines are in what is known as the "plane" of the mires. The most characteristic feature of these mires in our improvement is that they are luminous *per se*, instead of shining by reflected light, as in instruments of this class heretofore. We find great advantage in this, as we not only eliminate the dazzling effect on the patient of the rays from the illuminant shining on the interior surface of the concave disk, but we save one reflection—namely, that from the surface of the illuminated mires, by which a very considerable percentage of light was lost by absorption. Any mode of rendering the mires luminous save by reflected light is within the scope of our present invention, as they may be phosphorescent, shining by their own light, or, as is most convenient in practice, may be rendered luminous by lights placed behind the translucent substance of the mires and transmitted therethrough, as shown in the drawings.

In the preferred form illustrated in Figs. 1 and 7, 12 12 are hemispherical shells containing the illuminants, which are preferably small electric-light bulbs *v v*, connected by conductor-wires, through posts 14 14, with a suitable source of electrical energy, the connection being kept unbroken during the rotation of the disk by insulated rings 8 8, with which contact is made by springs 17 17, connected with the posts 14 14 by wires 18 18. The insulated rings are in electric connection with the source of energy by means of conductor-wires 15, which are concealed within the hollow standard or stem *t*. The mires *w w* are made of translucent or semitransparent material—such as ground glass, milky, opalescent, or cryolite glass, horn, &c.—said mires being inserted in the disk in front of the illuminated shells 12 12.

In order to be able to utilize mires fixed in position, instead of employing those movable and adjustable in position as heretofore, we resort to the means now to be described.

*f* is the inner or sliding tube of the telescope. This tube carries the double or birefringent prism *h h*, whose refractive plane is in the plane of the mires. The said prism may be made of any suitable refractive and transparent material either in one piece or in two pieces and is fixed in its position in the inner tube *f*, so as to slide with it. Said tube has attached thereto a means for moving the same, preferably a rack *o*, projecting through a slit *m* in the outer tube *d* and engaged by a pinion *p*, by which the inner tube can be traversed back and forth in the said outer tube. The pinion *p* is sustained by a pinion-block *r*, secured to outer tube *d* by suitable fastenings. On the axis of pinion *p* is a milled head *x* for turning the said pinion and a disk *y*, preferably in duplicate, graduated on its outer face on a scale of any convenient unit, either in millimeters, or fractional inches, or arbitrary divisions, to indicate diopters and fractions thereof of refraction corresponding to the apparent separation and approximation of the visual images of the mires, the effect of moving the prisms longitudinally back and forth, as described, being to approximate or separate the concurrent pencils of rays forming the said visual images in the eyepiece of the telescope in the plane of the mires. A longitudinal scale of a similar unit of graduation may also be placed on the outer tube with a pointer attached to the moving rack-piece *o*, or vice versa.

The mode of operation is as follows: The patient is seated in a chair at the object end of the telescope, facing the blackened concave disk and the luminous mires, with the head in a rest in the usual manner. The observer takes his position at the eyepiece, gets the object into focus, (said object being the corneal surface to be measured,) and turns the rotating disk with the mires to that meridional plane which has been selected as the zero meridian. The visual images of the two mires now appear by reflection from the cornea in the field of vision more or less separated. By turning the milled head *x* said images can be approximated until they appear to exactly touch each other and the position of the dioptric scale is noted. The tube with the disk and mires are now rotated through a given angle to bring the plane of the mires into a different meridian, when the approximation or separation of the mires, as the case may be, if any, is noted, and by bringing the images of the mires again into precise juxtaposition the exact amount of difference in refractive power of the cornea in the two meridians can be read off in diopters and fractions thereof, whence the difference of curvature can be estimated and the required convexity of the corrective lens at the given meridional angle can be exactly calculated, and so on for as many meridians as may be necessary to determine the entire contour of the corrective lens or lenses. This means of observation leaves nothing to the guesswork of either patient or observer, but records the exact differences of curvature in the abnormal cornea between any desired meridians or all meridians, measuring and indicating said differences in diopters and fractions thereof to any extent of refinement which the eye of the skilled observer is capable of detecting. It also establishes, of course, to the same degree of accuracy the normal or symmetrical form of the cornea where no astigmatism from this cause is existent.

The chief advantages of employing fixed self-illuminated and compact mires (usually circular) are, first, that the images thereof are always thrown on the cornea at a fixed angle, thereby eliminating one source of error, as when the distance between the mires has to be constantly adjusted and readjusted for each variation of corneal curvature; second, the luminous mires give a much clearer and brighter image as reflected from the cornea to the eye of the observer than when white mires illuminated by mere reflected light are used, one reflection being saved, and, third, the readings being made by the hand of the operator by rack-and-pinion adjustment on a single scale are much more convenient than where a plurality of sliding scales are employed, and the use of compact mires gives the maximum of accuracy, inasmuch as nothing is left to estimation or guesswork, but the exact difference in the separation of the images is mechanically recorded up to the limits of the powers of observation.

We claim and desire to secure by Letters Patent—

1. In an ophthalmometer, the combination of a telescope, a pair of mires fixed relatively to the axis of said telescope, and means within the telescope for causing approximation and separation of the images of said mires reflected from the corneal surface under observation into said telescope, substantially as specified.

2. In an ophthalmometer, a telescope, mires external to said telescope, and means for causing said mires to shine by non-reflected light, substantially as specified.

3. In an ophthalmometer, a concave disk, a pair of translucent mires borne thereon at fixed distances from the center thereof on a diametral line, and means for illuminating said mires by light transmitted therethrough, substantially as specified.

4. In an ophthalmometer, a telescope, means for causing luminous images to be reflected from the corneal surface under observation into said telescope, a double or birefringent prism located within said telescope, and means for moving said prism longitudinally backward and forward within the telescope, whereby the said luminous images are caused to visually approximate and separate, substantially as specified.

5. In an ophthalmometer, a telescope consisting of an outer tube provided with an object-lens and an eyepiece, an inner tube, a double or birefringent prism borne in said inner tube, means for moving said inner tube and prism backward and forward within said outer tube, and means for causing luminous images to be reflected from the corneal surface under observation into said telescope, substantially as specified.

6. In an ophthalmometer, a telescope, a disk bearing luminous mires, a double or birefringent prism within said telescope in the path of the optical rays, means for moving said prism longitudinally backward and forward within said telescope, and means for indicating the relative position of said prism in graduations, substantially as specified.

7. In an ophthalmometer, a telescope having a tube and customary lenses, a disk bearing luminous mires, an inner tube movable within said telescope-tube, a double or birefringent prism borne in said inner tube, a rack and pinion for moving said inner tube and said prism longitudinally in said telescope-tube, a rotary scale borne on the shaft of said pinion for indicating the position of said prism, and a fixed pointer for said scale, substantially as specified.

8. In an ophthalmometer, a telescope, a concave disk fixed thereon, a supporting-sleeve in which said telescope may be rotated, luminous mires fixed on said disk on a diametral line and at equal distances from the axis of rotation, and a birefringent prism within said telescope with means for moving said prism back and forth, whereby the visual images of the mires reflected from the corneal surface under observation may be approximated or separated, substantially as specified.

9. In an ophthalmometer, a telescope, a concave disk fixed concentrically thereon, a support in which said telescope and disk are rotarily sustained, a graduated disk on said support, an index on said telescope, fixed luminous mires on said disk, a double or birefringent prism within said telescope, whose plane of double refraction is in the plane of said mires, and a means for moving said prism back and forth longitudinally, whereby the visual images of said luminous mires are approximated or separated, substantially as specified.

10. In an ophthalmometer having a telescope for viewing the images of luminous objects reflected from the cornea of the eye, a means for detecting variations of curvature in the corneal surface under observation, consisting of a double or birefringent prism located within said telescope, and means for moving said prism longitudinally backward and forward therein, whereby the said reflected images are caused to approach or separate, substantially as specified.

11. In an ophthalmometer, the combination of a telescope, a pair of luminous mires exterior to the telescope, a double or birefringent prism with the telescope, and means for moving said prism longitudinally backward and forward within the telescope, substantially as and for the purpose described.

In testimony whereof we affix our signatures in presence of two witnesses.

CHARLES CHAMBERS INSKEEP.
JOHN EDGERLY CHAMBERS.

Witnesses:
DAVID CHAMBERS,
E. A. INSKEEP.